Oct. 26, 1926.

H. WEICHSEL 1,604,432

ALTERNATING CURRENT MOTOR

Filed June 20, 1925

INVENTOR
Hans Weichsel
BY E. E. Huffman
ATTORNEY

Patented Oct. 26, 1926.

1,604,432

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed June 20, 1925. Serial No. 38,394.

My invention relates to a self-excited synchronous induction motor, one of its objects being to produce a motor of this type which may be provided with commutating holes for the purpose of improving commutation and which will nevertheles be capable of operation in both directions of rotation without the necessity of providing more than one set of commutating holes per pole pair.

Another object is to provide means for adjusting the angular relation of the brush axis and the resultant direct current magnetization of the machine without moving the brushes.

Figure 1:
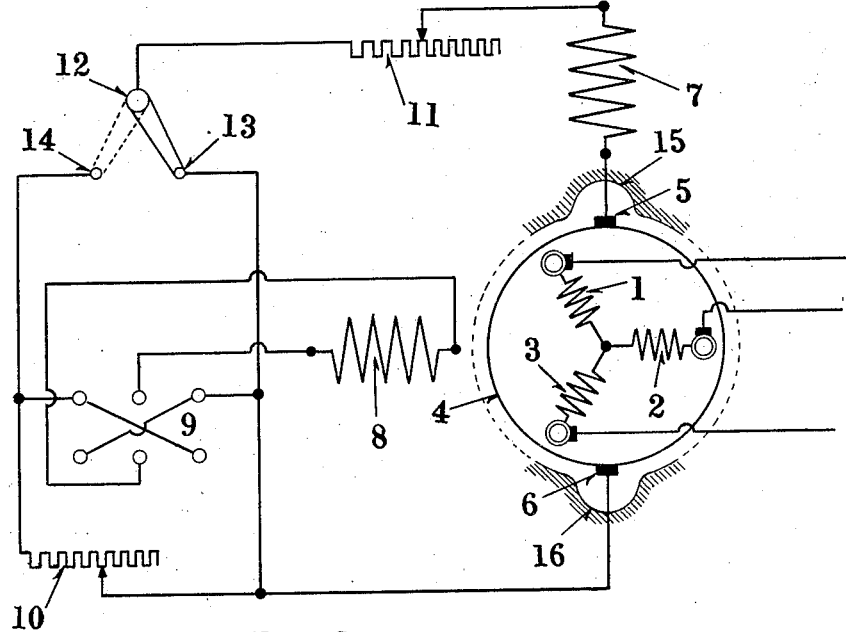
Figure 2:
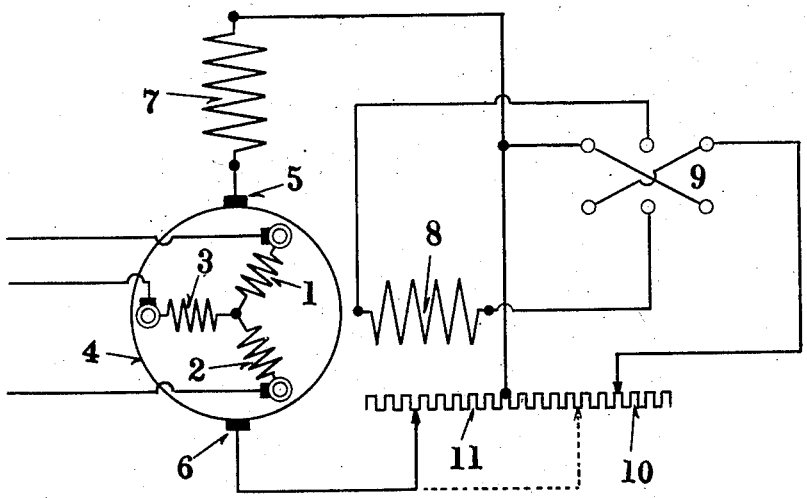

In the accompanying drawings Figure 1 illustrates a motor embodying my invention, and Figure 2 illustrates a modification with respect to the arrangement of resistances and connections but embodying the same principle of operation.

Referring to Figure 1, the revolving member which, in the motor illustrated is the primary member, is provided with a polyphase winding 1, 2, 3, adapted to be connected to the line by means of slip rings and with a commuted winding 4. Brushes 5, 6 cooperate with the commuted winding and are in circuit with the main exciting winding 7 on the stator or induced member, winding 7 being preferably coaxial with the brushes. The induced member is also provided with a winding 8 preferably displaced by 90 electrical degrees from the winding 7. The brush circuit has two branches, one comprising an adjustable resistance 10. The terminals of the winding 8 are connected to these branches, as shown, by means of reversing switch 9. The manner of connection of the branch circuits in the brush circuit is controlled by the switch 12, and the current in the brush circuit may be adjusted by means of resistance 11. As indicated at 15 and 16, the field structure of the secondary member has portions cut away at points where the coils of the commuted winding undergo commutation to reduce the flux density and improve the commutation in the general manner well understood. These cut away portions are usually referr d to as "commutating holes" and I so construct them as to cause a gradual rather than a sharp drop in flux density at the edges of the holes, this being accomplished by the sloping of these edges, as shown.

Referring to the operation of the machine, at starting resistances 10 and 11 are adjusted to suitable values and the switch 12 is placed on point 13. The rotating field produced by the polyphase winding induces currents in both windings on the stator, the current in winding 7 being controlled by the resistance 11 and that in winding 8 by resistance 10, and the machine starts as an induction motor. The resistances are decreased as the speed increases, and when synchronous speed has been attained the switch 12 is moved to point 14. In this position winding 8 and the winding 7 cooperate in producing the direct current exciting flux and cause this flux to be positioned at an angle to the brushes which is desirable for normal operation, and the winding 8 and resistance 10 are connected in the brush circuit in parallel. The proportion of the current flowing through the branch containing winding 8 will therefore be governed by the value of the resistance. I so adjust the windings and resistances that the conduced ampere turns produced by the winding 8 at synchronous speed, and at speeds near synchronism, will be less than the ampere turns produced by the winding 7, one purpose being to have the resultant direct current field of the machine displaced less than 45 electrical degrees from the brush axis whereby the pull-in torque will have a high value. This is very useful in bringing the machine into synchronism after it has been pulled out of step by overload.

To reverse the direction of rotation it is only necessary to change the direction of current through the winding 8 by means of reversing switch 9, which will cause the resultant axis of the direct current field of the machine to be located on the opposite side of the brush axis but at the same angle thereto as before and reversal can therefore be accomplished without changing the position of the brushes and therefore without the necessity of providing a second set of commutating holes. It will be understood that in addition to movement of switch 9 the line connection to the slip rings must be also reversed to reverse the direction of rotation.

In Figure 2 resistances 10 and 11 have been combined in the manner shown, the full line position of the contact of the resistance 11 indicating the starting position, and the dotted position of this contact indicating the running position wherein a portion of the resistance 10 is included in the brush circuit in parallel with the winding 8.

It will be noted that winding 8 is always in a closed circuit through the resistance 10 and winding 8 can therefore also act as a damping winding in connection with sudden load changes.

Having fully described my invention, what I claim as new and desire to secure by Letters Patent of the United States is:

1. In an alternating current motor, the combination of an inducing member provided with a commutator and brushes, a secondary member provided with a main exciting winding in circuit with the brushes and with an auxiliary winding displaced from the exciting winding, said secondary member being provided with commutating holes opposite the position of the coils of the commuted winding in which they undergo commutation, and means for connecting the auxiliary winding in circuit with the exciting winding, said means comprising a reversing switch for determining the direction of current through the auxiliary winding.

2. In an alternating current motor, the combination of an inducing member provided with a commutator and brushes, a secondary member provided with a main exciting winding in circuit with the brushes and with an auxiliary winding displaced from the exciting winding, means for connecting the auxiliary winding in series with the main exciting winding, and means whereby the conduced ampere turns produced by the auxiliary winding when in circuit with the exciting winding are less than those produced by the latter winding.

3. In an alternating current motor, the combination of an inducing member provided with a commutator and brushes, a secondary member provided with a main exciting winding in circuit with the brushes and with an auxiliary winding displaced from the exciting winding, said secondary member being provided with commutating holes opposite the position of the coils of the commuted winding in which they undergo commutation, means comprising a reversing switch for connecting the auxiliary winding in circuit with the main exciting winding, and means whereby the conduced ampere turns produced by the auxiliary winding when in circuit with the exciting winding are less than those produced by the latter winding.

4. In an alternating current motor, the combination of an inducing member provided with a commutator and brushes, a secondary member provided with a main exciting winding in circuit with the brushes and with an auxiliary winding displaced from the exciting winding, a resistance, and means for connecting the auxiliary winding in circuit with the main exciting winding in parallel with said resistance.

5. In an alternating current motor, the combination of an inducing member provided with a commutator and brushes, a secondary member provided with a main exciting winding in circuit with the brushes and with an auxiliary winding displaced from the exciting winding, said secondary member being provided with commutating holes opposite the position of the coils of the commuted winding in which they undergo commutation, a resistance, and means comprising a reversing switch for connecting the auxiliary winding in circuit with the main exciting winding in parallel with said resistance.

6. In an alternating current motor, the combination of an inducing member provided with a commutator and brushes, a secondary member provided with a main exciting winding in circuit with the brushes and with an auxiliary winding displaced from the exciting winding, said secondary member beng provided with commutating holes opposite the position of the coils of the commuted winding in which they undergo commutation, a resistance, and means comprising a reversing switch for connecting the auxiliary winding in circuit with the main exciting winding in parallel with said resistance, said resistance being adjusted to cause the conduced ampere turns produced by the auxiliary winding when in circuit with the main exciting winding to be less than those produced by the latter winding.

7. In an alternating current motor, the combination of an inducing member provided with a commutator and brushes thereon, an induced member having an exciting winding in circuit with the brushes and an auxiliary winding displaced from the exciting winding, means for establishing a closed circuit through the auxiliary winding at starting, and means for connecting the auxiliary winding in series with the exciting winding when suitable speed has been attained.

8. In an alternating current motor, the combination of an inducing member provided with a commutator and brushes thereon, an induced member having an exciting winding in circuit with the brushes and coaxial therewith and an auxiliary winding displaced from the exciting winding, means for establishing a closed circuit through the auxiliary winding at starting, and means for connecting the auxiliary winding in series with the exciting winding when suitable speed has been attained.

9. In an alternating current motor, the combination of an inducing member provided with a commutator and brushes, a secondary member provided with a main exciting winding in circuit with the brushes and coaxial therewith and with an auxiliary winding displaced from the exciting winding, said secondary member being provided with commutating holes opposite the position of the coils of the commuted winding in which they undergo commutation, and means for connecting the auxiliary winding in circuit with the exciting winding, said means comprising a reversing switch for determining the direction of current through the auxiliary winding.

In testimony whereof, I have hereunto set my hand this 15th day of June, 1925.

HANS WEICHSEL.